Sept. 5, 1967      J. R. WILHELM      3,339,738
ANTI-DRAINBACK VALVE FOR FILTER

Filed Nov. 13, 1963      2 Sheets-Sheet 1

INVENTORS
JOHN R. WILHELM
BY CHARLES J. CASALEGGI

Kenyon & Kenyon
ATTORNEYS

Sept. 5, 1967  J. R. WILHELM  3,339,738
ANTI-DRAINBACK VALVE FOR FILTER
Filed Nov. 13, 1963  2 Sheets-Sheet 2

INVENTORS
JOHN R. WILHELM
CHARLES J. CASALEGGI
BY
Kenyon & Kenyon
ATTORNEYS

United States Patent Office 3,339,738
Patented Sept. 5, 1967

3,339,738
ANTI-DRAINBACK VALVE FOR FILTER
John R. Wilhelm, Perth Amboy, and Charles J. Casaleggi, New Monmouth, N.J., assignors to Purolator Products, Inc., Rahway, N.J., a corporation of Delaware
Filed Nov. 13, 1963, Ser. No. 323,309
2 Claims. (Cl. 210—136)

This application is a continuation-in-part application of our copending application Ser. No. 72,914, filed Dec. 1, 1960 (now abandoned).

The present invention relates to a throwaway type filter, and more particularly, to an anti-drainback valve for said filter.

In a screw-on throwaway type filter, the filter is generally mounted directly against the engine block and the entire unit is discarded and replaced with a new filter cartridge when the filter becomes clogged. Such a filter generally takes the full flow of oil and continuously filters it. It has a by-pass valve so the engine will not starve of oil should the filter become clogged for any reason. This type of filter is disclosed in U.S. Patent No. 2,884,133 granted to Walulik et al. The filter also is provided with an anti-drainback valve so that once oil is pumped into the filter cartridge from the engine oil pump, it will open this valve and go directly to the engine parts requiring lubrication, but will not drain back to the engine crankcase. The anti-drainback valve is necessary because otherwise, the oil will flow or drain back into the crankcase when the engine is shut down, thereby causing the engine to be starved of oil upon initial starting of the engine the next time it is put into operation.

The anti-drainback valve used heretofore consisted of either a ball check valve, or that shown in the above mentioned Walulik patent, consisting of a flat rubber diaphragm with a biasing metal member, urging the rubber diaphragm in a seated or closed position over the oil inlet ports.

An object of the present invention is to provide an anti-drainback valve which consists of a resilient diaphragm member or disc requiring no biasing means or other parts and which by itself is the anti-drainback valve.

Another object of the present invention is to provide an anti-drainback valve consisting of an annular flexible member having sufficient rigidity and body and having a durometer reading so that it may flex into an open position when the pressure of the oil flowing through the filter exceeds a predetermined value, and will return to a closed position to prevent leakage of oil back to the engine pump when the engine is idle.

Still another object of the present invention is to provide a simple, inexpensive anti-drainback valve comprising an annular rubber-like disc disposed in a screw-on type throwaway filter cartridge, so that it is held in tension out of its natural shape to close off the oil inlet means and continuously seeks to return to its original configuration.

An additional object of the invention is to restrict the engagement of the valve disc and the cover of the filter case to a predetermined outer area of the disc in order to improve the sealing function thereof.

A further object of the invention is to provide a filter device in which the valve disc is both flexed and biased with respect to the valve seat in order to improve its sealing action.

In one embodiment of the invention the filter device comprises a casing having a filter element disposed within. The cover member for the casing includes a substantially cone-shaped portion diverging from its central outlet and terminating in an annular periphery which is disposed between the central axis of the casing and its inner surface. The cone-shaped portion contains at least one inlet opening adjacent to its annular periphery. The device further includes a flexible valve disc overlying the cone-shaped portion of the cover member and adapted to abut the surface adjacent to the annular periphery in order to block flow from the interior of the casing toward the inlet opening. With this arrangement flow can pass through the inlet opening into the filter device during operation of the engine but is prevented from flowing in the reverse direction whenever engine operation is terminated.

In another embodiment of the invention the valve disc is flexed against the cone-shaped portion of the cover member adjacent its annular periphery in order to preload the valve disc in the direction for closing.

In an additional embodiment of the invention, there is provided a diaphragm spring overlying the valve disc and urging it into engagement with the valve seat.

In a further embodiment of the invention, a portion of the filter element engages the diaphragm spring and valve disc in order to position them with respect to the cover member of the casing.

Various other objects and advantages of the present invention will be readily apparent from the following detailed description, when considered in connection with the accompanying drawing forming a part thereof, and in which.

Figures 1, 2, 3:
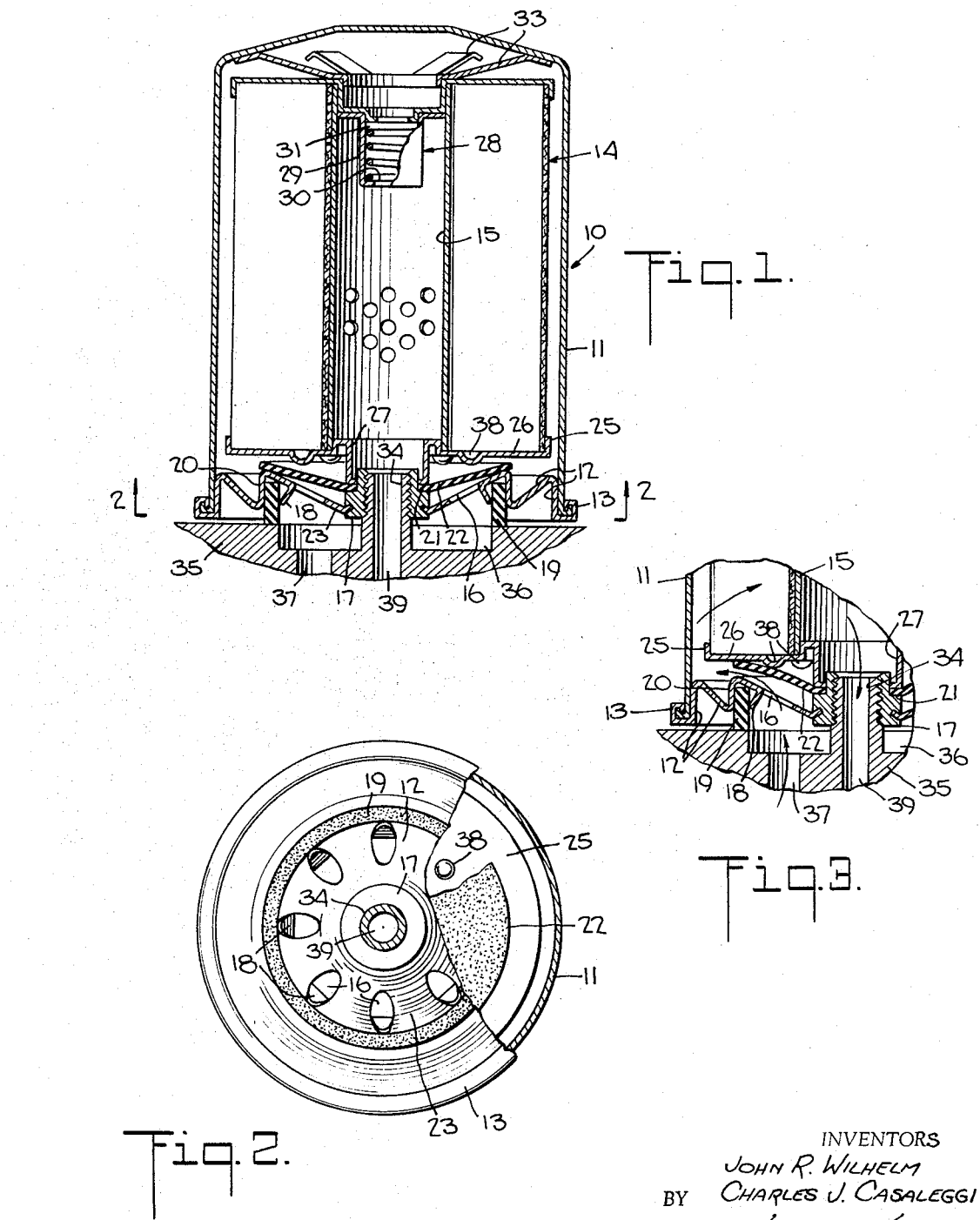
FIG. 1 is a side elevational view in section of a screw-on type filter cartridge with the anti-drainback valve in a closed position.
FIG. 2 is a plan view, partly broken away, of the bottom member of the filter cartridge of FIG. 1.
FIG. 3 is a fragmentary detail view of the anti-drainback valve in an open position.

Referring to the drawing, the reference numeral 10 generally designates one embodiment of a filter consisting of an open end cylindrical metal casing 11 with a circular metal closure member 12 closing off the bottom. The casing and closure member 12 are provided with corresponding lips rolled together to form an oil-tight lock seam 13 which permanently encloses an annular resin impregnated pleated paper filter element or cartridge 14 therein, having a perforated center tube 15.

Closure member 12 is provided with circumferentially spaced inlet ports 16 disposed around an internally threaded central nipple or boss 17 extending into the casing which forms an oil discharge port for the casing. Inlet ports 16 are formed in the sheet metal closure member by piercing it to form a downwardly and outwardly extending tongue 18 adjacent each inlet port. Tongues 18 hold an annular sealing gasket 19 against the bottom of the casing adjacent an inner vertical rib 20 formed in the closure member. The central boss 17 is provided with a slot in its outer periphery into which the inner periphery of the closure member is inserted and secured thereby in by conventional metal working methods. An annular shoulder 21 is provided on the boss and an annular rubber-like disc 22 is mounted around the boss and seats on the shoulder to form the anti-drainback valve. The closure member has an inner conical tension band 23 around the boss joined to vertical rib 20 against which the peripheral portion of the disc seats.

The lower end cap 25 of the filter element comprises an annular metal trough 26 with upturned inner and outer rims having a depending central sleeve 27 which fits over the central boss and seats against the anti-drainback disc 22. Shoulder 21 is formed on the boss so that it is below the upper end of tension band 23 so that the disc is normally held in a cone-shaped configuration. It has been found that the disc must be of a resilient rubber-like material having a "Shore A" durometer reading of between substantially 60 and 90 units so that a tension is set up in it when it is a concave configuration and it will continuously seek to flatten out or return to its free normal shape to thereby form a liquid-tight seal with the upper end of the tension band 23, as seen in FIG. 1. The thickness of the disc is preferably .042 inch to .078 inch.

A conventional by-pass valve 28 comprising a sleeve 29, a compression spring 30 therein and a valve disc 31, is disposed in the center tube 15 for by-passing oil around the filter element, should it become clogged. The filter element is maintained seated against the anti-drainback disc on the central boss by a metal spider member 33 in the upper end of the casing.

The filter is threaded onto a bushing 34 disposed in an engine block 35 so that the sealing gasket 19 forms a fluid-tight seal to prevent oil leakage between the filter and the engine block. An annular recess 36 is formed in the engine block around bushing 34 and inwardly of gasket 19. This recess communicates with an oil inlet passage 37 which receives oil from the engine pump not shown, while the bushing 34 forms an oil discharge passage 39 in communication wtih the engine parts which require lubrication. The end cap 25 is provided with circumferentially spaced protuberances 38 on the bottom of the trough 26 to prevent the anti-drainback disc 22 from accidentally seating against the end cap and possibly sticking thereagainst.

Oil flows into the filter casing through inlet ports 16 and the pressure of the oil forces the anti-drainback disc 22 into an open position so that the oil flows under and around the outer periphery of the disc, as shown in FIG. 3. The oil then passes in an outside-in direction through the filter element and is discharged through the center tube 15 and bushing 34 to the engine parts.

When the engine is shut off the resilient and anti-drainback disc 22, which is constantly under tension and attempts to return from its unnatural conical shape to a flat annular disc, will form and oil-tight seal with the upper end of tension band 23. Thus, any oil in the filter casing or in the bushing 34 and the engine parts will not drain back through the inlet ports 16 to the crankcase.

Figure 4:
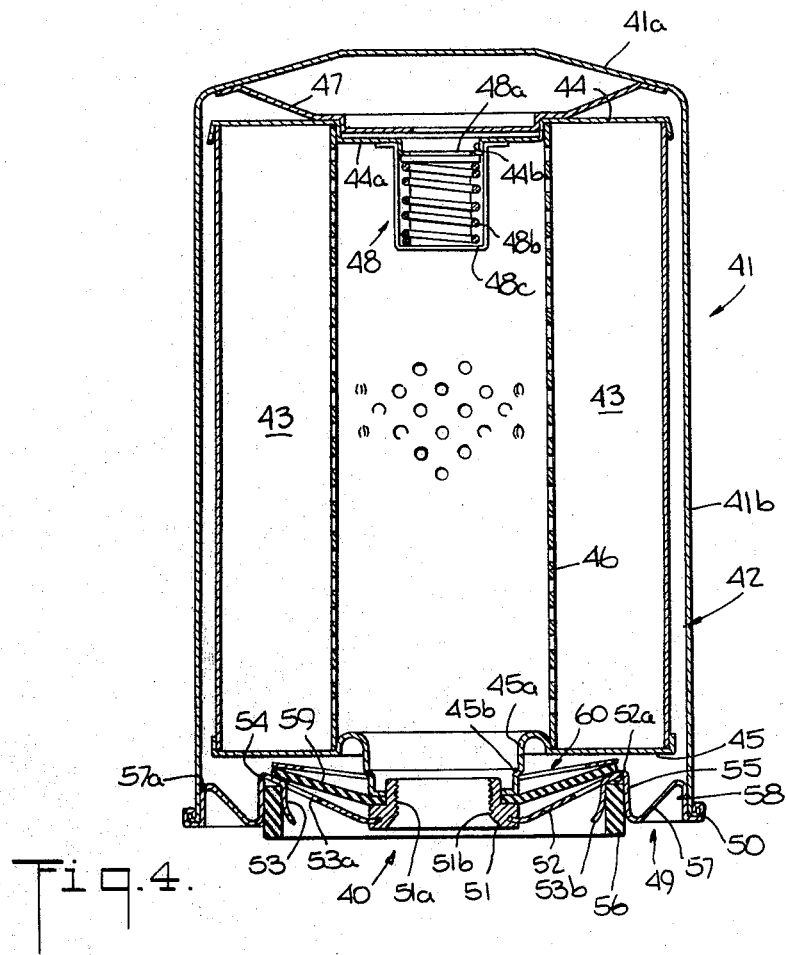
FIG. 4 is a side elevational view in section of a screw-on type filter cartridge showing the diaphragm spring urging the valve disc forward the valve seat.
Figure 5:
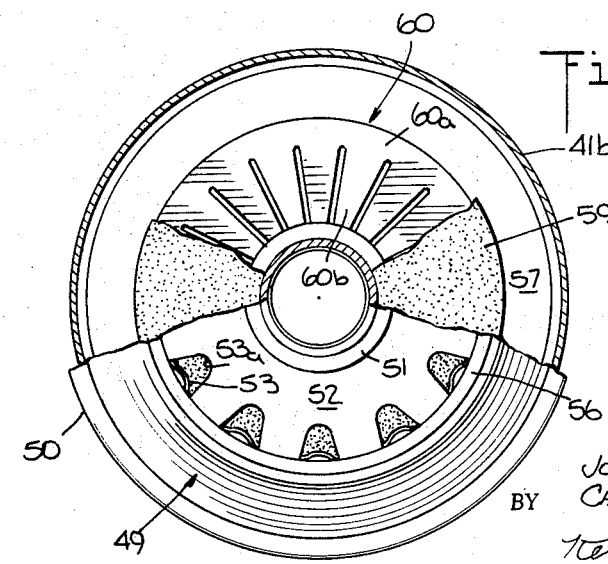
FIG. 5 is a plan view, partly broken away, of the cover member of the filter cartridge of FIG. 4.

In another embodiment of the invention, fluid filter device 40 includes casing or case 41 having closed end 41a and wall portion 41b (FIG. 4). Within the interior of filter 40 there is provided filter element 42 which includes filter material such as pleated paper filter 43 mounted between end caps 44 and 45. The end caps are spaced apart and secured with respect to one another by means of tube 46 which is perforated along its length.

Filter element 42 is supported within case 41 by flat spring 47 attached to closed end 41a of the case. The flat spring engages recessed portion 44a of the end cap adjacent to central opening 44b therein. Normally closed relief valve 48 including disc 48a and spring 48b mounted within yoke 48c prevents flow through opening 44b except when the relief valve pressure setting is reached.

The open end portion of case 41 is closed by means of cover member or cover 49 which is attached to the case by means of double lockseam 50. Cover 49 includes a central outlet opening formed by the passage through bushing 51. Bushing 51 contains threads 51a for attaching filter 40 to a suitable threaded pipe or connection leading to the lubrication system of an internal combustion engine. Cover 49 further includes inner cone-shaped portion 52 extending from the bushing and diverging toward the interior of case 41. Tabs 53 are punched in an outward direction from cone-shaped portion 52 and result in the formation of openings or inlet openings 53a. Cone-shaped portion 542 terminates in annular periphery 54 which is disposed between the central axis of the case and the inner surface of wall 41b thereof. From annular periphery 54 annular band 55 extends in an outward direction. The slot formed between annular band 55 and tabs 53 is adapted to receive and hold gasket 56 to cover 49. End portion 53b of tab 53 is provided with a curved form directed toward the central axis of the filter device in order to facilitate the insertion of gasket 56 into the slot. Cover 49 further includes outer cone-shaped portion 57 which extends from annular band 55 and diverges towards the interior of the filter. Additional annular band 58 connects annular periphery 57a of cone-shaped portion 57 to case 41 at lockseam 50.

When bushing 51 is connected to the mating portion of the engine and when gasket 56 is engaged with the mounting surface on the engine block, pressured oil can be delivered to the annular chamber disposed about bushing 51 and enclosed by gasket 56.

During operation pressured oil flows into the interior of case 41 by means of inlet openings 53a and then passes from the outside toward the inside of filter element 42. After the oil is filtered by pleated paper 43, the oil passes through the openings in tube 46 and then passes out of the filter and enters the lubricating system of the engine by means of the passage through bushing 51. If the pressure drop across filter element 42 exceeds a predetermined limit either due to clogging of the filter element or to the presence of excessively viscous oil, relief valve 48 opens and bypasses filter element 42. Thus flow can enter by way of inlet opening 53a pass between the filter element and the inner surface of the case, pass through relief valve 48, and exit by way of the opening in bushing 51.

When the engine is shut down, the filter is filled with oil and without the provisions of the invention, the oil would empty through the inlet openings and back through the oil system of the engine. If this emptying occurs, upon subsequently starting the engine, it is necessary for the oil pump to first fill the filter case with oil before the pump can establish a level of oil pressure through bushing 51 to the oil system of the engine. This delay in the building up of the normal engine oil pressure can at least be alarming to the operator and possibly damaging to the engine.

To prevent the draining out of the oil from the filter there is provided anti-drainback valve or valve disc 59 which is mounted on shoulder 51b of bushing 51 and engages annular portion or seat 52a of inner cone-shaped portion 52 adjacent to annular periphery 54. Shoulder 51b is spaced apart from the point at which cone-shaped portion 52 is attached to bushing 51 and therefore the cone angle of disc 59 is necessarily flatter than that of the cone-shaped portion. Since annular periphery 54 is elevated with respect to shoulder 51b, disc 59 must be flexed even when in its rest or closed position of engaging the surface of cone-shaped portion 52.

End cap 45 contains tubular member 45a which connects tube 46 to the passage through bushing 51. Flange 45b of tubular portion 45a engages disc 59 adjacent to shoulder 51b and due to the urging of spring 47, the flange holds the disc in place on the shoulder. With this arrangement it can be seen that disc 59 engages seat 52a of inner cone-shaped portion 52 between inlet openings 53a and annular periphery 54. At this location the surface of the disc and seat 52a are nearly parallel so that the sealing area is a narrow annular one. Since the sealing area is smooth and relatively flat, the flexed disc can make an effective seal with it. Due to the difference in cone angles the disc is necessarily spaced apart at its inner portions from the inner cone-shaped portion 52. The result of this spacing is that it insures that the weight of oil bearing upon the disc urges the disc into tight contact at portion 52a. Thus by restricting the support of the outer portion of disc 59 to seat 52a, the contact pressure in this portion is increased and improves the sealing action.

The placing of inlet openings 53a adjacent to the outer portion of disc 59 results in the inflowing oil striking the outer portion of the disc where there is the greatest advantage from a mechanical leverage standpoint in flexing disc 59 to its open position. This enables the jets of oil to pass through the inlet openings until a minimum of pressure drop. Placing of the openings in this location provides the additional advantage of enabling tabs 53 to be disposed in a region where they can serve to retain gasket 56 in position.

Experience has shown that it is sometimes possible for disc 59 to fail to provide an oil tight seal since the disc may slowly return to its position of engagement with seat 52a after a prolonged period of engine operation. If this occurs a quantity of oil can flow from the filter prior to resealing of disc 59. Similarly any accumulation of sludge or other foreign matter adjacent to surface portion 52a can also retard or prevent the complete sealing of disc 59. To prevent leakage of this type, the filter is provided with spring or diaphragm spring 60 having outer portion 60a connected to a plurality of radial fingers 60b. Tubular portion 45 is provided with shoulder 45b which engages the inner ends of fingers 60b and thereby urges spring 60 toward disc 59. Thus outer portion 60 of the spring tightens disc 59 against seat 52a and prevents any tendency of leakage past the disc whenever engine operation is terminated. Since the spring engages the disc at a level above that at which shoulder 45b engages the spring, the spring is necessarily assembled into the filter in a deflected state which serves to preload disc 59 against seat 52a. With this arrangement it can be seen that the assembly of the filter device is greatly simplified since it is merely necessary to place filter element 42, spring 60, disc 59 and cover 49 in a stacked relationship, to assemble them with case 41, and to form lockseam 50.

Inasmuch as various changes may be made in the form, location and relative arrangement of the several parts without departing from the essential characteristics of the invention, it will be understood that the invention is not to be limited except by the scope of the appended claims.

What is claimed:

1. A fluid filter device comprising a casing having an open end portion; a filter element disposed within said casing; a cover member for closing said open end portion, said cover member having a central outlet opening and a substantial cone-shaped portion diverging from said outlet opening toward the interior of said casing and terminating in an annular periphery disposed between the central axis of said casing and the inner surface thereof, said cone-shaped portion having at least one inlet opening therein adjacent said annular periphery; a flexible valve disc overlying the surface of said cone-shaped portion facing the interior of said casing, the central portion of said disc being secured adjacent said outlet opening of said cover member and spaced apart from and overlying said cone-shaped portion at a location positioned further from the interior of said casing than said annular periphery, said valve disc being adapted to flex and abut said surface adjacent the annular periphery of said inner cone-shaped portion to block flow from the interior of said casing toward said inlet opening; and a diaphragm spring overlying the surface of said valve disc facing the interior of said casing, means for positioning said spring with the central portion of said spring spaced apart from said valve disc and the outer peripheral portion of said spring urging said valve disc toward the surface of said cone-shaped portion adjacent said annular periphery thereof.

2. A fluid filter device comprising a casing having an open end portion; a filter element disposed within said casing, said filter element having a tubular outlet portion extending in an outward direction with respect to said casing and in communication with the interior of said element; a cover member for closing said open end portion, said cover member having a central outlet opening, a substantially cone-shaped portion diverging from said outlet opening toward the interior of said casing and terminating in an annular periphery disposed between the central axis of said casing and the inner surface thereof, said cone-shaped portion having at least one inlet opening therein adjacent said annular periphery and a tubular member disposed about said outlet opening and extending in an inward direction with respect to said casing, said tubular member having a shoulder portion spaced apart from said outlet opening; a flexible valve disc having its inner portion mounted adjacent said shoulder portion and overlying the surface of said cone-shaped portion facing the interior of said casing, said valve disc being spaced apart from said cone-shaped portion between adjacent said inlet opening and said tubular member, said tubular portion of said filter element urging the inner portion of said valve disc toward said shoulder portion, said valve disc being adapted to abut said surface adjacent the annular periphery of said cone-shaped portion to block flow from the interior of said casing toward said inlet opening; and an annular diaphragm spring disposed about said tubular outlet portion and overlying the surface of said valve disc facing the interior of said casing, means for positioning said spring with the central portion of said spring spaced apart from said valve disc and said spring having an outer peripheral portion urging said valve disc toward the annular periphery of said inner cone-shaped portion.

References Cited

UNITED STATES PATENTS

| | | | |
|---|---|---|---|
| 2,747,609 | 5/1956 | Sekera | 137—560 |
| 2,995,249 | 8/1961 | Boewe et al. | |
| 2,995,253 | 8/1961 | Belgarde et al. | |
| 3,042,215 | 7/1962 | Gruner. | |

REUBEN FRIEDMAN, *Primary Examiner.*

F. W. MEDLEY, *Assistant Examiner.*